United States Patent
Mellon

(10) Patent No.: US 12,517,468 B2
(45) Date of Patent: Jan. 6, 2026

(54) ASTROPHYSICAL TIMING DERIVED FROM PHOTOMETRIC RELATIVE PHASE MEASUREMENTS OF PERIODIC STELLAR VARIABILITY

(71) Applicant: United States of America as represented by the Secretary of the Navy, San Diego, CA (US)

(72) Inventor: Samuel Nicholas Mellon, Summerville, SC (US)

(73) Assignee: United States of America, as represented by the Secretary of the Navy, Washington, DC (US)

( * ) Notice: Subject to any disclaimer, the term of this patent is extended or adjusted under 35 U.S.C. 154(b) by 466 days.

(21) Appl. No.: 18/214,010

(22) Filed: Jun. 26, 2023

(65) Prior Publication Data

US 2024/0427295 A1  Dec. 26, 2024

(51) Int. Cl.
  *G04F 13/02* (2006.01)
  *G01C 21/02* (2006.01)

(52) U.S. Cl.
  CPC ............. *G04F 13/02* (2013.01); *G01C 21/02* (2013.01)

(58) Field of Classification Search
  CPC .......... G01C 21/02; G01C 17/34; G01C 1/00; G01C 17/28; G01C 3/30; G04F 13/02; G04G 99/00
  See application file for complete search history.

(56) References Cited

U.S. PATENT DOCUMENTS 7,197,381 B2 * 3/2007 Sheikh ...................... B64G 1/36
                                                    250/203.1
7,831,341 B2 * 11/2010 Sheikh ...................... G01S 5/16
                                                    701/13

(Continued)

FOREIGN PATENT DOCUMENTS

RU         2453813         6/2012

OTHER PUBLICATIONS

Samuel N. Mellon et al.; Discovery of Delta Scuti Pulsations in the Young Hybrid Debris Disk Star HD 156623; The Astrophysical Journal, 870:36 (11pp), Jan. 1, 2019.

(Continued)

*Primary Examiner* — Yaritza Guadalupe-McCall
(74) *Attorney, Agent, or Firm* — Naval Information Warfare Center Atlantic; Kyle Eppele; J. Eric Anderson

(57) ABSTRACT

A method for deriving an independent current time estimate from celestial sources comprising: providing a reference measurement for a variable-intensity celestial source, wherein the reference measurement comprises the celestial source's photometric structure at a known time, at a known stellar period, and at a known periodic phase; creating a phase-folded light curve for the celestial source; measuring an intensity of the celestial source at a subsequent time; comparing the measured intensity of the celestial source to the phase-folded light curve to derive a set of possible phase differences, wherein each possible phase difference corresponds to a potential derived time based on the known time and the known stellar period of the reference measurement; and analyzing the set of possible phase differences to derive the current astrophysical time.

20 Claims, 6 Drawing Sheets

(56) References Cited

U.S. PATENT DOCUMENTS

| | | | | |
|---|---|---|---|---|
| 2005/0192719 A1* | 9/2005 | Sheikh | ............... | B64G 1/36 |
| | | | | 701/13 |
| 2006/0235614 A1* | 10/2006 | Jacox | ............... | G09B 27/00 |
| | | | | 701/513 |
| 2009/0018762 A1* | 1/2009 | Sheikh | ............... | G01S 11/12 |
| | | | | 701/513 |
| 2009/0135676 A1* | 5/2009 | Kelley | ............ | G04B 49/00 |
| | | | | 368/15 |
| 2024/0427295 A1* | 12/2024 | Mellon | ............ | G04G 99/00 |
| 2025/0181033 A1* | 6/2025 | Moore | ............ | G04B 19/26 |
| 2025/0264333 A1* | 8/2025 | Wheeler | ......... | G01C 21/005 |

OTHER PUBLICATIONS

Samuel N. Mellon et al.; Bright Southern Variable Stars in the bRing Survey; The Astrophysical Journal Supplement Series, 244:15 (23pp), Sep. 2019.

Samuel Nicholas Mellon; The Beta Pictoris b Ring (bRing) Survey of the Southern Sky; Thesis, Department of Physics and Astronomy Arts, Sciences and Engineering School of Arts and Sciences University of Rochester, Rochester, New York 2019.

Jeffrey D. Scargle; Studies in Astronomical Time Series Analysis. II. Statistical Aspects of Spectral Analysis of Unevenly Spaced Data; The Astrophysical Journal, 263:835-853, Dec. 15, 1982.

\* cited by examiner

```
                    ┌─────────────────────────────────────────────────┐
                    │ Provide a reference measurement for a variable- │
                    │ intensity celestial source, wherein the         │──10a
                    │ reference measurement comprises the celestial   │
                    │ source's photometric structure at a known time, │
                    │ at a known stellar period, and at a known       │
                    │ periodic phase.                                 │
                    └─────────────────────────────────────────────────┘
                                         │
                                         ▼
                    ┌─────────────────────────────────────────────────┐
                    │ Create a phase-folded light curve for the       │──10b
                    │ celestial source.                               │
                    └─────────────────────────────────────────────────┘
                                         │
                                         ▼
                    ┌─────────────────────────────────────────────────┐
                    │ Measure an intensity of the celestial source    │──10c
                    │ at a subsequent time.                           │
                    └─────────────────────────────────────────────────┘
                                         │
                                         ▼
                    ┌─────────────────────────────────────────────────┐
                    │ Compare the measured intensity of the celestial │
                    │ source to the phase-folded light curve to       │
                    │ derive a set of possible phase differences,     │
                    │ wherein each possible phase difference          │──10d
                    │ corresponds to a potential derived time based   │
                    │ on the known time and the known stellar period  │
                    │ of the reference measurement.                   │
                    └─────────────────────────────────────────────────┘
                                         │
                                         ▼
                    ┌─────────────────────────────────────────────────┐
                    │ Analyze the set of possible phase differences   │──10e
                    │ to derive the current astrophysical time.       │
                    └─────────────────────────────────────────────────┘
```

```
┌─────────────────────────────────────────────────────┐
│ Create, with a computer, a database of reference measurements of │
│ variable celestial source's photometric structure at a given time, at a │ ⎤— 60ₐ
│ given stellar period, and at a known periodic phase. │
└─────────────────────────────────────────────────────┘
                            │
                            ▼
┌─────────────────────────────────────────────────────┐
│ Create a phase-folded light curve for each celestial │
│ source having a reference measurement in the database. │ ⎤— 60ᵦ
└─────────────────────────────────────────────────────┘
                            │
                            ▼
┌─────────────────────────────────────────────────────┐
│ Collect photons at a first subsequent time from a plurality of the │
│ celestial sources having a reference measurement in the database to │ ⎤— 60c
│ create a first target measurement for each of the plurality of celestial │
│ sources at the first subsequent time. │
└─────────────────────────────────────────────────────┘
                            │
                            ▼
┌─────────────────────────────────────────────────────┐
│ Compare each first target measurement to a corresponding phase- │
│ folded light curve to derive a first set of possible phase differences. │ ⎤— 60d
└─────────────────────────────────────────────────────┘
                            │
                            ▼
┌─────────────────────────────────────────────────────┐
│ Analyze the first set of possible phase differences │ ⎤— 60ₑ
│ to derive the current astrophysical time. │
└─────────────────────────────────────────────────────┘
```

*Fig. 6*

ASTROPHYSICAL TIMING DERIVED FROM PHOTOMETRIC RELATIVE PHASE MEASUREMENTS OF PERIODIC STELLAR VARIABILITY

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Atlantic, Code 70F00, North Charleston, SC, 29419-9022; voice (843) 218-3495; email ssc_lant_T2@navy.mil. Reference Navy Case Number 211462.

BACKGROUND OF THE INVENTION

This invention relates to methods for determining an independent current time estimate. Precise time measurements are useful for accurate navigation and the support of communications on Earth and in space. Clocks work by counting a periodic event with a known frequency. The official time of the United States of America is kept by a cesium oscillator (sometimes referred to generically as an atomic clock). Synchronizing with a reference atomic clock can sometimes be interrupted or unavailable. There is a need to independently derive a current astrophysical time measurement regardless of one's location with respect to a reference atomic clock.

SUMMARY

Disclosed herein is a method for deriving an independent current time estimate from celestial sources comprising the following steps. One step includes providing a reference measurement for a variable-intensity celestial source. The reference measurement comprises the celestial source's photometric structure at a known time, at a known stellar period, and at a known periodic phase. Another step provides for creating a phase-folded light curve for the celestial source. Another step provides for measuring an intensity of the celestial source at a subsequent time. Another step provides for comparing the measured intensity of the celestial source to the phase-folded light curve to derive a set of possible phase differences. Each possible phase difference corresponds to a potential derived time based on the known time and the known stellar period of the reference measurement. Another step provides for analyzing the set of possible phase differences to derive the current astrophysical time.

Another embodiment of the method for deriving an independent current time estimate from celestial sources is also disclosed as comprising the following steps. One step provides for creating, with a computer, a database of reference measurements. Each reference measurement corresponds to a separate celestial source having a periodically-varying brightness. Each reference measurement includes data about the corresponding celestial source's photometric structure at a given time, at a given stellar period, and at a known periodic phase. Another step provides for creating a phase-folded light curve for each celestial source having a reference measurement in the database. Another step provides for collecting photons at a first subsequent time from a plurality of the celestial sources having a reference measurement in the database to create a first target measurement for each of the plurality of celestial sources at the first subsequent time. Another step provides for comparing each first target measurement to a corresponding phase-folded light curve to derive a first set of possible phase differences. Each possible phase difference corresponds to a potential derived time based on the given time and the given stellar period of the corresponding reference measurement. A final step provides for analyzing the first set of possible phase differences to derive the current astrophysical time.

BRIEF DESCRIPTION OF THE DRAWINGS

Throughout the several views, like elements are referenced using like references. The elements in the figures are not drawn to scale and some dimensions are exaggerated for clarity.

FIG. 1 is a flowchart of an embodiment of an astrophysical timing derivation method.

FIG. 6 is a flowchart for a method for deriving a current astrophysical time.

DETAILED DESCRIPTION OF EMBODIMENTS

Figure 2A:
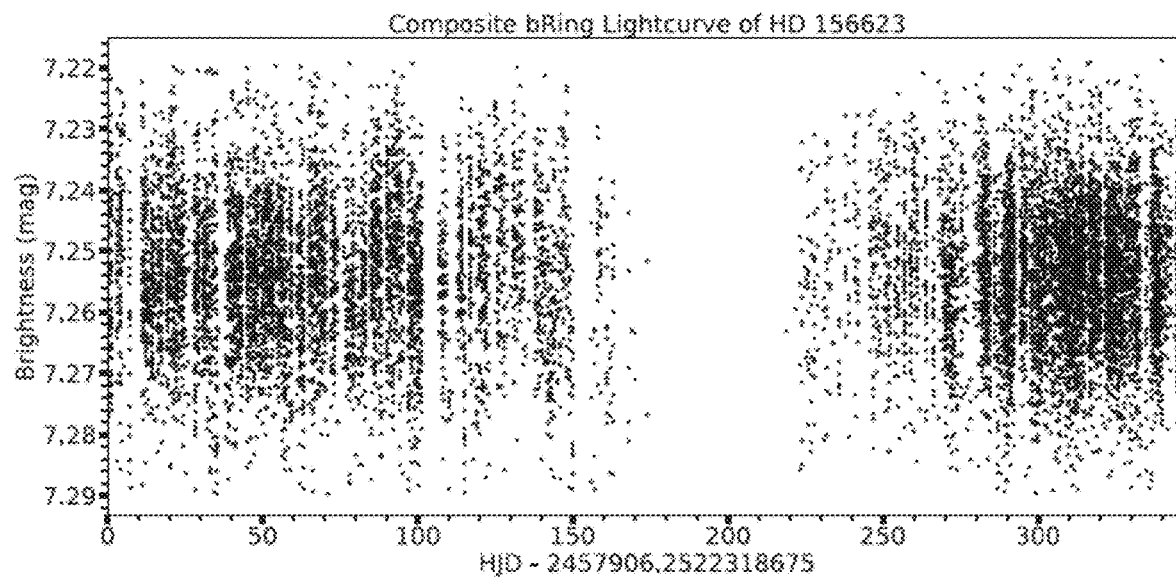
FIG. 2A is a plot of a light curve of a variable star.

The disclosed methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

FIG. 1 is a flowchart of an embodiment of an astrophysical timing derivation method 10. Method 10 enables the derivation of an independent current time estimate from celestial sources and comprises the following steps. The first step 10a involves providing a reference measurement for a variable-intensity celestial source. The reference measurement comprises the celestial source's photometric structure at a known time, at a known stellar period, and at a known periodic phase. Another step 10b provides for creating a phase-folded light curve for the celestial source. Another step 10c provides for measuring an intensity of the celestial source at a subsequent time. Another step 10d provides for comparing the measured intensity of the celestial source to the phase-folded light curve to derive a set of possible phase differences. Each possible phase difference corresponds to a potential derived time based on the known time and the known stellar period of the reference measurement. Another step 10e provides for analyzing the set of possible phase differences to derive the current astrophysical time.

Since method 10 arrives at an independent current time estimate from celestial sources, with the correct modifications for reference frame, it can be used as a universal time source that can be synced from anywhere on the globe. Examples of correcting one's reference frame can be found in the paper by Samuel N. Mellon et al., "Bright Southern Variable Stars in the bRing Survey," The Astrophysical Journal Supplement Series, 244:15 (23pp), 2019 September, which paper is incorporated by reference herein in its entirety (hereinafter referred to as Mellon1). Method 10 allows for the current astrophysical time to be derived only from the collected photons from brightness measurements and reference measurements. Celestial sources with variable light intensity can include any celestial source whose observed brightness is not constant over time (i.e., can exhibit changes in their light intensity measurements). Changes to a celestial source's observed brightness is usually driven by some form of intrinsic or extrinsic force that is astrophysical in nature. Stars having a brightness that changes have been dubbed variable stars. Photons may be measured from the variable stars over a given exposure and the measurements may be later time stamped and condensed into a representative stellar flux at a given time. After a variable star has been sampled multiple times, one can reconstruct a light curve that is representative of the periodic mode(s) exhibited by the star. For example, the star HD 156623 is a variable star known as δ Scuti, whose pulsations are driven intrinsically by the κ-mechanism.

Figure 2B:
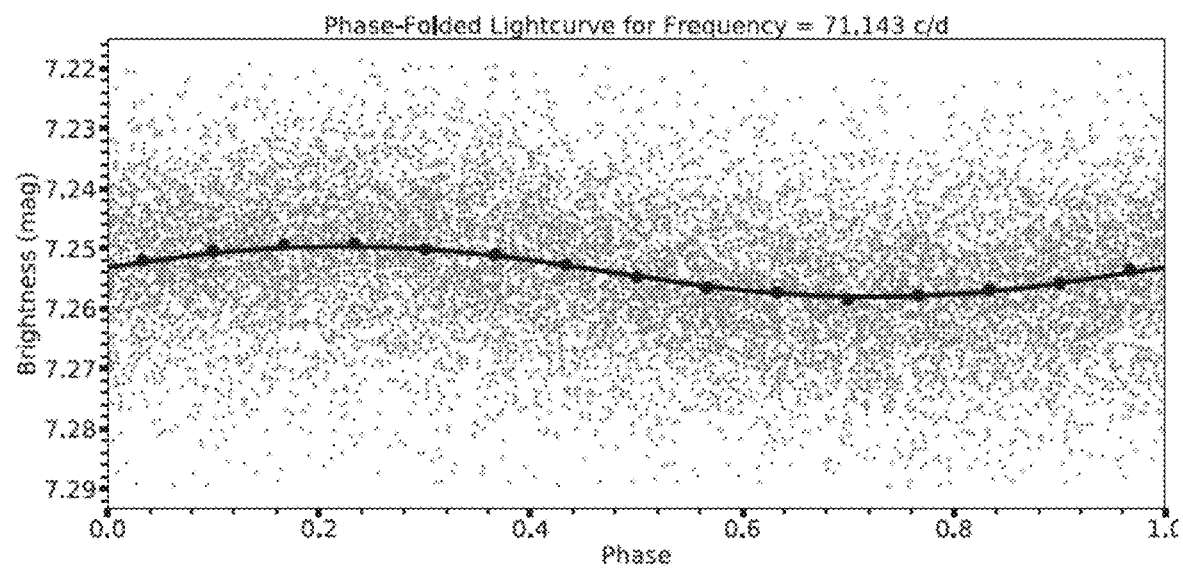
FIG. 2B is a plot of a phase-folded light curve of a variable star.

FIG. 2A is a graph showing an example prior art composite light curve of variable star HD 156623, δ Scuti, as shown in the paper, "Discovery of δ Scuti Pulsations in the Young Hybrid Debris Disk Star HD 156623" by Samuel N. Mellon et al., The Astrophysical Journal, 870:36 (11pp), 2019 Jan. 1, which paper is incorporated by reference herein in its entirety (hereinafter referred to as Mellon2). FIG. 2B is a graph showing the light curve data in FIG. 2A phase-folded onto a template light curve, which for this type of star, a sine wave with a period of about 71 cycle/day, which is the dominant period. As shown in Mellon2, this can be done for many variable stars of many different types simultaneously.

Figure 3A:
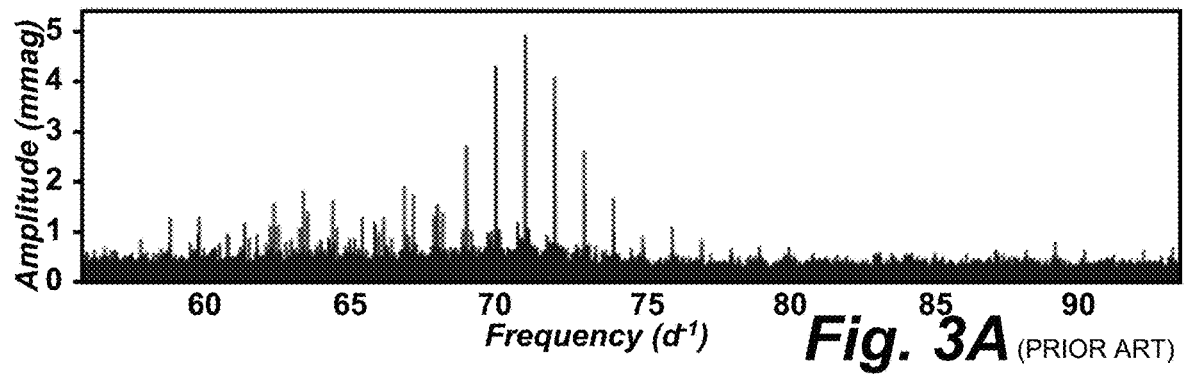
FIGS. 3A, 3B, 3C, and 3D are Lomb-Scargle periodograms.
Figure 3B:
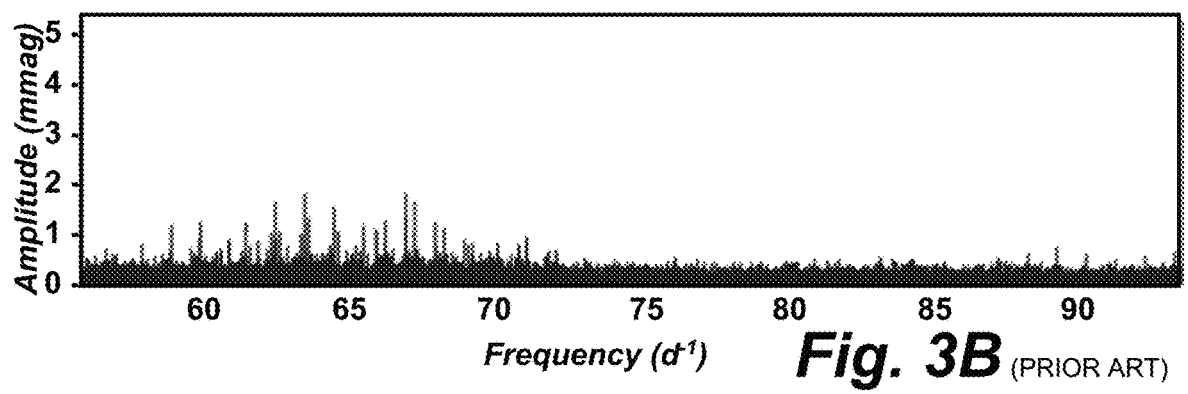
Figure 3C:
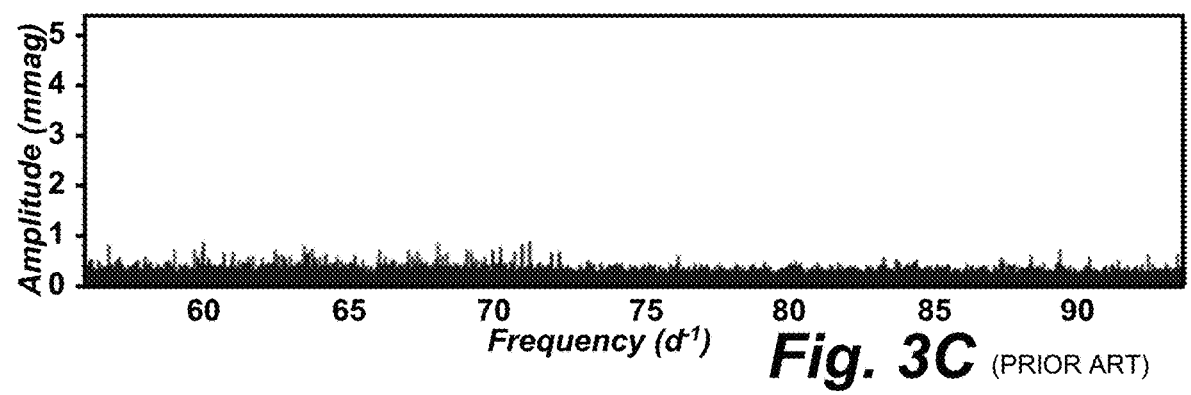
Figure 3D:
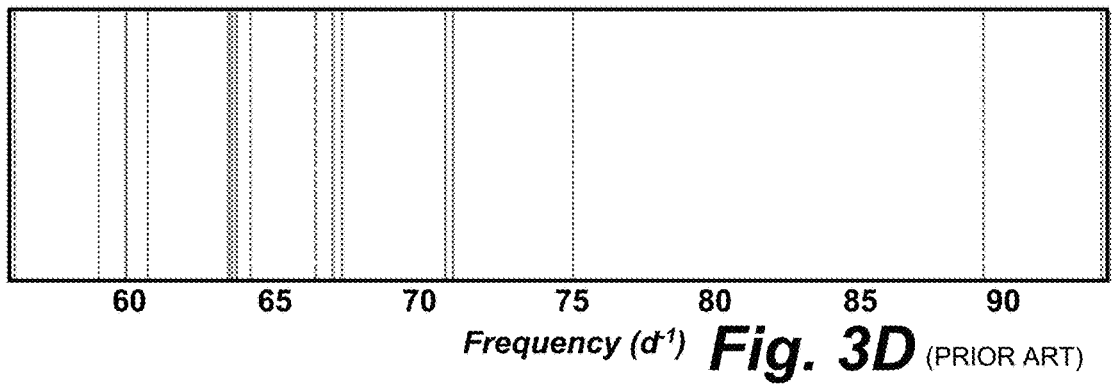

FIGS. 3A-3D show prior art examples of Lomb-Scargle periodograms. FIG. 3A is an example of the HD 156623 composite light curve plotted on a Lomb-Scargle periodogram. FIG. 3B shows the residual periodogram after a cleaning process comprising the removal of the primary frequency, which leads to the spectrum of multiple periods observed in the variable star. FIG. 3C shows the residual noise periodogram. FIG. 3D shows the projections of nine confirmed frequencies of HD 156623 plotted with solid lines and seven candidate frequencies plotted with dashed lines. The frequency span is between 56 and 93.5 day$^{-1}$ to focus on the & Scuti features. The light curve data may then be phase-folded onto a template light curve (for this type of star, a sine wave with a period of about 71 cycle/day, which is the dominant period). As shown in Mellon2, this can be done for many variable stars of many different types simultaneously.

Based on the brightness of a target measurement and where it falls on the phase-folded light curve of a given star, one can compare the target measurement to a reference measurement and derive a set of possible phase differences (e.g., for a sinusoid-type periodic source, the phase differences are usually displaced by a factor of the number pi). Each of these phase differences corresponds to a new time based on the known time taken at the reference measurement and the known period of the star, but a single star measurement does not necessarily lead to a unique time solution due to the inherently periodic nature of the star. Adding more stars (of different periodic nature) to the reference measurement (and latter target measurement) leads to individual sets of phase differences for each star. One can then begin examining the phase differences between each star and the possible times (based on the reference measurements and known periods) that the possible locations in phase correspond to. Once this is complete, one can begin cross-referencing the phase measurements between sets of stars. Given that the sets of stars have inherently different periodic natures, a final timing solution will be converged upon as the phase difference between multiple sets of stars will only be possible for fewer and fewer possible times (i.e., the solution becomes more unique with a greater number of stars used). These steps may be accomplished with a computer, or once few enough possible times have been arrived, human common sense and logic can be used to determine the final timing solution in a given case (e.g., it could have been two weeks since the previous measurement, but not 10 years).

Suitable examples of the celestial source include, but are not limited to, eclipsing binary star systems, δ Scuti stars, and resident space objects orbiting the Earth. The following is a description of an example embodiment of method 10 as applied to a single eclipsing binary star system. Eclipsing binaries are a type of extrinsic variable star system that involves two stars orbiting each other such that the normal to the plane of their orbit is oriented such that the stars will eclipse each other on the line of sight to Earth (this is usually very close to a 90-degree angle). Due to the interest in eclipsing binaries academically, publicly available data and ephemerides are available that may be used to predict the eclipsing cycle.

Figure 4:
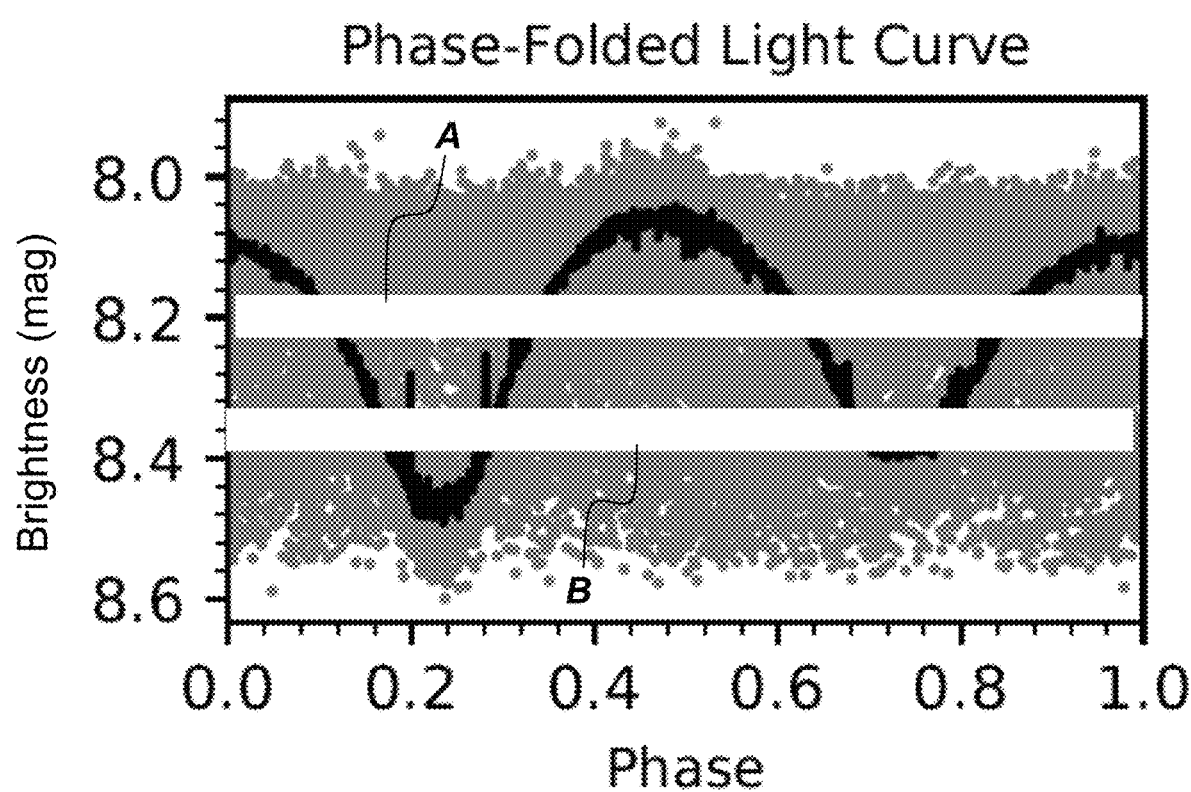
FIG. 4 is a plot of an example phase-folded light curve for an eclipsing binary star system.

FIG. 4 is a plot adapted from Mellon1 of an example phase-folded light curve for an eclipsing binary HD 37909 with a measured period of 0.4617 days with a 9 second uncertainty; each minor tick in the phase legend corresponds to about 0.01847 days (i.e., 26 minutes). Using HD 37909 as an example, let's say measurement A, represented by the solid white line in FIG. 4, of 8.20±0.05 magnitudes is taken at an unknown time T over a 5-second exposure. Thus, it is possible that measurement A corresponds to a phase of about 0.12±0.001, 0.27±0.001, 0.57±0.001, or 0.82±0.001, as shown in FIG. 4. About 26 minutes later, one takes a new measurement B, represented by the second solid white line, and finds the star is fainter at 8.35±0.05. Since the star has gotten fainter, previous measurements of 0.27 and 0.82 can be ruled out for the phase as these would require the star to becoming brighter over the course of 26 minutes. Next, one would have to determine whether you are in the first dip or the second dip. One can continue observations to determine which dip you are in, or, one can reference publicly available ephemerides for the corresponding star and their approximation to previous sunset. If it is known the measurement B was first measured 26 minutes after sunset, then one needs to simply identify the ephemeris that best corresponds to an eclipse just after sunset starting from the last known time signal lock. One can also compare to measurements of other eclipsing binaries and their ephemerides and determine a time uniquely based on their current phased light curves and last known time data.

The uncertainty of the above example may be simply measured by eye for 5% photometry, which is achievable by a wide field of view telescope. Photon measurements from celestial sources may be achieved by any device capable of measuring photons or assessing light intensity. Suitable examples of the photon measurement device include, but are not limited to, telescopes, mobile photon collection devices, and hand-held photon measurement devices. Challenges that need to be considered for determining actual photometry are the size and efficiency of the telescope and gimbal, background sky glow, and atmospheric distortion. By eye, 5% photometry corresponds to about a 0.1% uncertainty in the phase measurement, which is about 0.0005 days or 39 seconds. If the distribution of periods from 100 eclipsing binaries is Gaussian distributed, then this corresponds to a standard error of the mean (SEM) of about 4 seconds. It should be noted that these periods are not necessarily Gaussian distributed. The uncertainty in the phase measurement will also improve as more data are taken and photometric uncertainty improves.

Figure 5A:
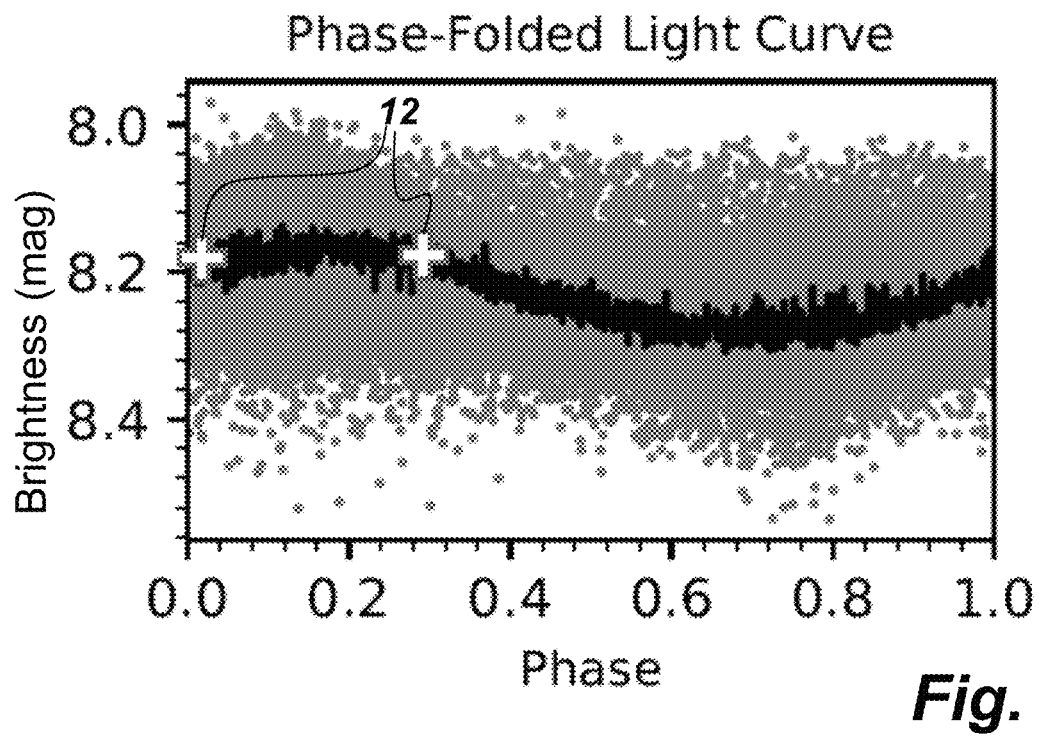
FIGS. 5A and 5B are plots of phase-folded light curves
Figure 5B:
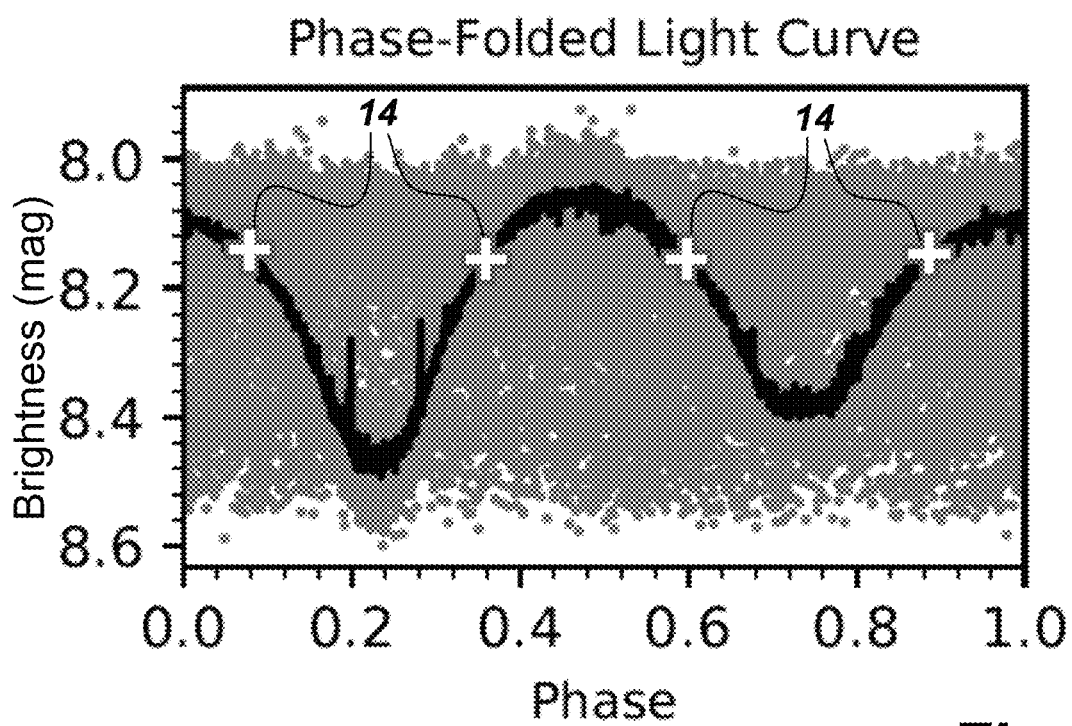

FIGS. 5A and 5B are plots of phase-folded light curves, also adapted from Mellon1, that may be used to describe a multivariable phase-based timing example of method 10 with dramatically improved estimated SEMS over the single binary star system example. The multivariable phase-based timing example of method 10 aligns a set of phase measurements from many stars taken simultaneously to determine a unique time solution. Let's say you achieve 5% photometry on a field containing 100 variable stars. You then identify the possible measured phases at that time based on a priori phase-folded light curves. FIG. 5A shows an example phase-folded light curve with two possible measured phases 12. FIG. 5B shows another example phase-folded light curve with four possible measured phases 14. Given a reference point at some prior time, one can estimate the time each of these individual measurements belongs to. However, the cyclic nature of these stars means that a time solution from a single star is not unique as the same measurement can repeat multiple times in a light curve and will be repeated every cycle.

Still referring to the multivariable phase-based timing example of method 10 introduced above, in this situation, you have 100 stars that all have independent, uncorrelated measurements of the variable phase taken at the exact same time (FIGS. 5A and 5B are provided as examples). These possible phases can be organized into different sets. For example, one can build eight unique sets based on the phase measurements above (i.e., the ones shown in FIGS. 5A and 5B). The more stars there are, the more unique sets can be built. Each of these sets corresponds to fewer and fewer possible times that these values of phase can align together. Eventually, as more stars are added, a unique time solution will emerge through a combination of statistics and logical deduction (i.e., a daytime solution is not possible at nighttime). This is from a single measurement. If multiple measurements are used to determine the current trend of the light curve (magnitude increasing and decreasing), sets can be immediately eliminated as discussed above with reference to the eclipsing binary example. Multiple fields can be used to contribute to overall time measurement.

FIG. 6 is a flowchart of an example embodiment of method 10. A first step 60a provides for creating, with a computer, a database of reference measurements. In this example, each reference measurement corresponds to a separate celestial source having a periodically-varying brightness, and each reference measurement includes data about the corresponding celestial source's photometric structure at a given time, at a given stellar period, and at a known periodic phase. Another step 60b provides for creating a phase-folded light curve for each celestial source having a reference measurement in the database. Another step 60c provides for collecting photons at a first subsequent time from a plurality of the celestial sources having a reference measurement in the database to create a first target measurement for each of the plurality of celestial sources at the first subsequent time. Another step 60a provides for comparing each first target measurement to a corresponding phase-folded light curve to derive a first set of possible phase differences. Each possible phase difference corresponds to a potential derived time based on the given time and the given stellar period of the corresponding reference measurement. Another step 60€ provides for analyzing the first set of possible phase differences to derive the current astrophysical time.

From the above description of the astrophysical timing derivation method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

I claim:

1. A method for deriving an independent current time estimate from celestial sources comprising:
   providing a reference measurement for a variable-intensity celestial source, wherein the reference measurement comprises the celestial source's photometric structure at a known time, at a known stellar period, and at a known periodic phase;
   creating a phase-folded light curve for the celestial source;
   measuring an intensity of the celestial source at a subsequent time;
   comparing the measured intensity of the celestial source to the phase-folded light curve to derive a set of possible phase differences, wherein each possible phase difference corresponds to a potential derived time based on the known time and the known stellar period of the reference measurement; and
   analyzing the set of possible phase differences to derive the current astrophysical time.

2. The method of claim 1, wherein the celestial source is selected from the group consisting of:
   eclipsing binary star systems, δ Scuti stars, and resident space objects orbiting the Earth.

3. The method of claim 1, wherein the celestial source is an eclipsing binary star system.

4. The method of claim 1, wherein the analyzing step comprises:
   selecting a single phase difference from the first set of possible phase differences that most closely aligns with an expected astrophysical time.

5. The method of claim 4, wherein the selecting step is performed by a human.

6. The method of claim 4, wherein the selecting step is performed by a computer.

7. The method of claim 4, further comprising:
   performing the providing, creating, measuring, and comparing steps of claim 1 for each of the plurality of different variable-intensity celestial sources; and
   wherein the analyzing step comprises analyzing the set of possible phase differences from each of the plurality of different variable-intensity celestial sources to derive the current astrophysical time.

8. The method of claim 7, further comprising:
   measuring an intensity of each of the plurality of different variable-intensity celestial sources at a second subsequent time;
   comparing the measured intensity of each of the plurality of different variable-intensity celestial sources to a corresponding phase-folded light curve at the subsequent time and at the second subsequent time to derive a set of possible phase differences for each of the plurality of different variable-intensity celestial sources; and analyzing the sets of possible phase differences to derive the current astrophysical time.

9. The method of claim 7, wherein the reference measurements come from published ephemerides.

10. The method of claim 9, wherein the measuring steps are performed with a mobile photon collection device.

11. The method of claim 1, wherein the current astrophysical time is derived only from the collected photons and a database of reference measurements.

12. A method for deriving a current astrophysical time comprising:

creating, with a computer, a database of reference measurements, wherein each reference measurement corresponds to a separate celestial source having a periodically-varying brightness, and wherein each reference measurement includes data about the corresponding celestial source's photometric structure at a given time, at a given stellar period, and at a known periodic phase;

creating a phase-folded light curve for each celestial source having a reference measurement in the database;

at a first subsequent time, collecting photons from a plurality of the celestial sources having a reference measurement in the database to create a first target measurement for each of the plurality of celestial sources at the first subsequent time;

comparing each first target measurement to a corresponding phase-folded light curve to derive a first set of possible phase differences, wherein each possible phase difference corresponds to a potential derived time based on the given time and the given stellar period of the corresponding reference measurement; and analyzing the first set of possible phase differences to derive the current astrophysical time.

13. The method of claim 12, wherein the analyzing step comprises:

selecting a single phase difference from the first set of possible phase differences that most closely aligns with an expected astrophysical time.

14. The method of claim 13, wherein the selecting step is performed by a human.

15. The method of claim 13, wherein the selecting step is performed by a computer.

16. The method of claim 12, wherein the current astrophysical time is derived only from the collected photons and the database of reference measurements.

17. The method of claim 12, wherein the plurality of celestial sources is selected from one or more of the group consisting of: eclipsing binary star systems, δ Scuti stars, and resident space objects orbiting the Earth.

18. The method of claim 12, wherein the plurality of celestial sources consists of a single eclipsing binary star system.

19. The method of claim 12, further comprising:

at a second subsequent time, collecting photons from the plurality of the celestial sources having a reference measurement in the database to create a second target measurement for each of the plurality of celestial sources at the second subsequent time;

comparing each second target measurement to a corresponding phase-folded light curve to derive a second set of possible phase differences, wherein each possible phase difference corresponds to a potential derived time based on the given time and the given stellar period of the corresponding reference measurement; and wherein the analyzing step further comprises analyzing the first and second sets of possible phase differences for each of the plurality of celestial sources to derive the current astrophysical time.

20. The method of claim 12, wherein the database of reference measurements is compiled, at least in part, from published ephemerides.

\* \* \* \* \*